US009785556B2

(12) United States Patent
Sundararaman et al.

(10) Patent No.: US 9,785,556 B2
(45) Date of Patent: Oct. 10, 2017

(54) CROSS-DIE INTERFACE SNOOP OR GLOBAL OBSERVATION MESSAGE ORDERING (71) Applicant: Intel Corporation, Santa Clara, CA (US)

(72) Inventors: Ramacharan Sundararaman, Hillsboro, OR (US); Tracey L. Gustafson, Hudson, MA (US); Robert J. Safranek, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 25 days.

(21) Appl. No.: 14/582,148

(22) Filed: Dec. 23, 2014

(65) Prior Publication Data
US 2016/0179673 A1 Jun. 23, 2016

(51) Int. Cl.
*G06F 12/08* (2016.01)
*G06F 12/0831* (2016.01)

(52) U.S. Cl.
CPC ...... *G06F 12/0831* (2013.01); *G06F 12/0833* (2013.01); *G06F 2212/621* (2013.01); *Y02B 60/1225* (2013.01)

(58) Field of Classification Search
CPC ............. G06F 12/0831; G06F 12/0835; G06F 12/0813; G06F 12/0811; G06F 12/0822;
(Continued)

(56) References Cited

U.S. PATENT DOCUMENTS 5,339,399 A * 8/1994 Lee ..................... G06F 12/0831
711/146
5,535,345 A * 7/1996 Fisch ..................... G06F 15/17
710/108
(Continued)

FOREIGN PATENT DOCUMENTS

CN 105718349 A 6/2016
EP 3037972 A1 6/2015
(Continued)

OTHER PUBLICATIONS

Extended European Search Report received for European Patent Application No. 15195503.6, dated May 18, 2016, 7 pages.
(Continued)

*Primary Examiner* — Shawn X Gu
*Assistant Examiner* — Jean Edouard
(74) *Attorney, Agent, or Firm* — Alpine Technology Law Group LLC (57) ABSTRACT

Methods and apparatus relating to techniques for Cross-Die Interface (CDI) snoop and/or go (or completion) message ordering are described. In one embodiment, the order of a snoop message and a completion message are determined based at least on status of two bits. The snoop and completion messages are exchanged between a first integrated circuit die and a second integrated circuit die. The first integrated circuit die and the second integrated circuit die are coupled through a first interface and a second interface and the snoop message and the completion message are exchanged over at least one of the first interface and the second interface. Other embodiments are also disclosed.

26 Claims, 6 Drawing Sheets (58) Field of Classification Search
CPC ........ G06F 15/177; G06F 13/00; G06F 13/28; G06F 17/30
See application file for complete search history.

(56) References Cited

U.S. PATENT DOCUMENTS

| | | | | |
|---|---|---|---|---|
| 5,623,628 | A * | 4/1997 | Brayton | G06F 12/0831 710/39 |
| 5,751,995 | A * | 5/1998 | Sarangdhar | G06F 9/3834 711/123 |
| 6,023,747 | A * | 2/2000 | Dodson | G06F 12/0831 711/118 |
| 7,010,740 | B1 * | 3/2006 | Walton | G06F 11/2005 714/763 |
| 8,538,922 | B2 * | 9/2013 | Beier | G06F 17/30551 707/634 |
| 2004/0068595 | A1 * | 4/2004 | Dieffenderfer | G06F 12/0831 710/105 |
| 2005/0262250 | A1 | 11/2005 | Batson et al. | |
| 2007/0043913 | A1 * | 2/2007 | Hetherington | G06F 12/0813 711/141 |
| 2007/0073977 | A1 * | 3/2007 | Safranek | G06F 12/0835 711/141 |
| 2008/0005484 | A1 * | 1/2008 | Joshi | G06F 12/0815 711/141 |
| 2008/0126707 | A1 * | 5/2008 | Sistla | G06F 12/0804 711/118 |
| 2009/0313435 | A1 * | 12/2009 | Thantry | G06F 12/0828 711/120 |
| 2010/0005246 | A1 * | 1/2010 | Beers | G06F 12/0831 711/146 |
| 2010/0174936 | A1 * | 7/2010 | Hill | G06F 1/10 713/500 |
| 2010/0332927 | A1 * | 12/2010 | Kurts | G06F 11/2236 714/724 |
| 2011/0289263 | A1 * | 11/2011 | McWilliams | G06F 12/0284 711/103 |
| 2012/0079032 | A1 * | 3/2012 | Vash | H04L 67/10 709/206 |
| 2012/0079156 | A1 * | 3/2012 | Safranek | G06F 12/0835 710/305 |
| 2012/0317362 | A1 | 12/2012 | Hendry et al. | |
| 2013/0007046 | A1 * | 1/2013 | Baum | G06F 13/4022 707/769 |
| 2013/0111149 | A1 | 5/2013 | Moll et al. | |
| 2014/0040561 | A1 * | 2/2014 | Lih | G06F 12/0831 711/135 |
| 2014/0112339 | A1 | 4/2014 | Safranek et al. | |
| 2014/0114928 | A1 | 4/2014 | Beers et al. | |
| 2016/0041767 | A1 | 2/2016 | Kitsunai et al. | |

FOREIGN PATENT DOCUMENTS

| | | |
|---|---|---|
| JP | 2010015572 A | 1/2010 |
| JP | 2013016160 A | 1/2013 |
| JP | 2014532923 A | 12/2014 |
| TW | 200928749 A | 1/2009 |

OTHER PUBLICATIONS

Office Action received for Korean Patent Application No. 2015-0163072, dated Jul. 28, 2016, 11 pages including 5 pages of English translation.

Office Action received for Japanese patent application No. 2015-223743, dated Sep. 20, 2016, 9 pages including 4 pages of English translation.

Office Action received for Korean Patent Application No. 2015-0163072, dated Dec. 6, 2016, 6 pages including 3 pages of English translation.

Office Action and Search Report received for Taiwanese Patent Application No. 104136689 dated Dec. 15, 2016, 8 pages including 1 page of English translation.

Communication received from the European Patent Office for European Patent Application No. 15195503.6, dated Jul. 4, 2016, 2 pages.

Notice of Publication received for Chinese Patent Application No. 201510819454.6, dated Jul. 6, 2016, 2 pages including 1 page of English translation.

Letters of Patent received for Japanese Patent Application No. 2015-223743, issued on Feb. 17, 2017 as Japanese Patent No. 6092351, 2 pages.

* cited by examiner

CROSS-DIE INTERFACE SNOOP OR GLOBAL OBSERVATION MESSAGE ORDERING

This invention was made with Government support under contract number H98230-11-3-0011 awarded by the Department of Defense. The Government has certain rights in this invention.

FIELD

The present disclosure generally relates to the field of electronics. More particularly, an embodiment relates to techniques for Cross-Die Interface (CDI) snoop and/or Global Observation (GO) message ordering.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

As discussed herein, a "snoop" or bus snoop generally refers to a technique used in shared memory to achieve cache coherence. For example, a snoop message can be used to determine the status of a cache line across shared memory devices and ensure that the same memory location that is present in two or more locations/caches is kept coherent with the other corresponding memory locations across a computing system with shared memory devices. Further, a "GO" (or Global Observation) message generally refers to a message type that indicates completion of one or more operations. Also, a "flit" (short for flow control digit) refers to the smallest unit of flow control. Messages are generally made up of multiple flits. Additionally, a "flit" may include 80 bits in an embodiment, e.g., with 8 bits for error detection, 8 bits for link-layer header, and 64 bits for data, although other configurations can also be used.

Some embodiments provide a coherent Cross-Die Interface (CDI) snoop and/or GO or Global Observation (also referred to as "completion") message ordering. More specifically, Coherent CDI includes a rule with respect to ordering of snoop and GO messages and the rule requires that GO messages can pass snoop messages, but snoop messages do not pass GO messages to the same address (otherwise, coherency and the TSO (Total Store Ordering) memory consistency model can be broken). Implementing this rule can be complex because snoop messages contain an address, whereas GO messages do not. So, all GO/Snoop messages need to be treated as potentially conflicting. To this end, an embodiment splits up the time windows into "epochs" relative to when a GO or Snoop message arrives, which are associated with bits called "epoch bits". An embodiment utilizes epoch bits and packing rules of a flit to efficiently pack a coherent CDI flit to ensure the absence of any conflicting message in a flit. Unpacking rules can then be used to recreate the epoch bits at the receiver end to comply with the snoop/GO ordering rules.

Figure 1:
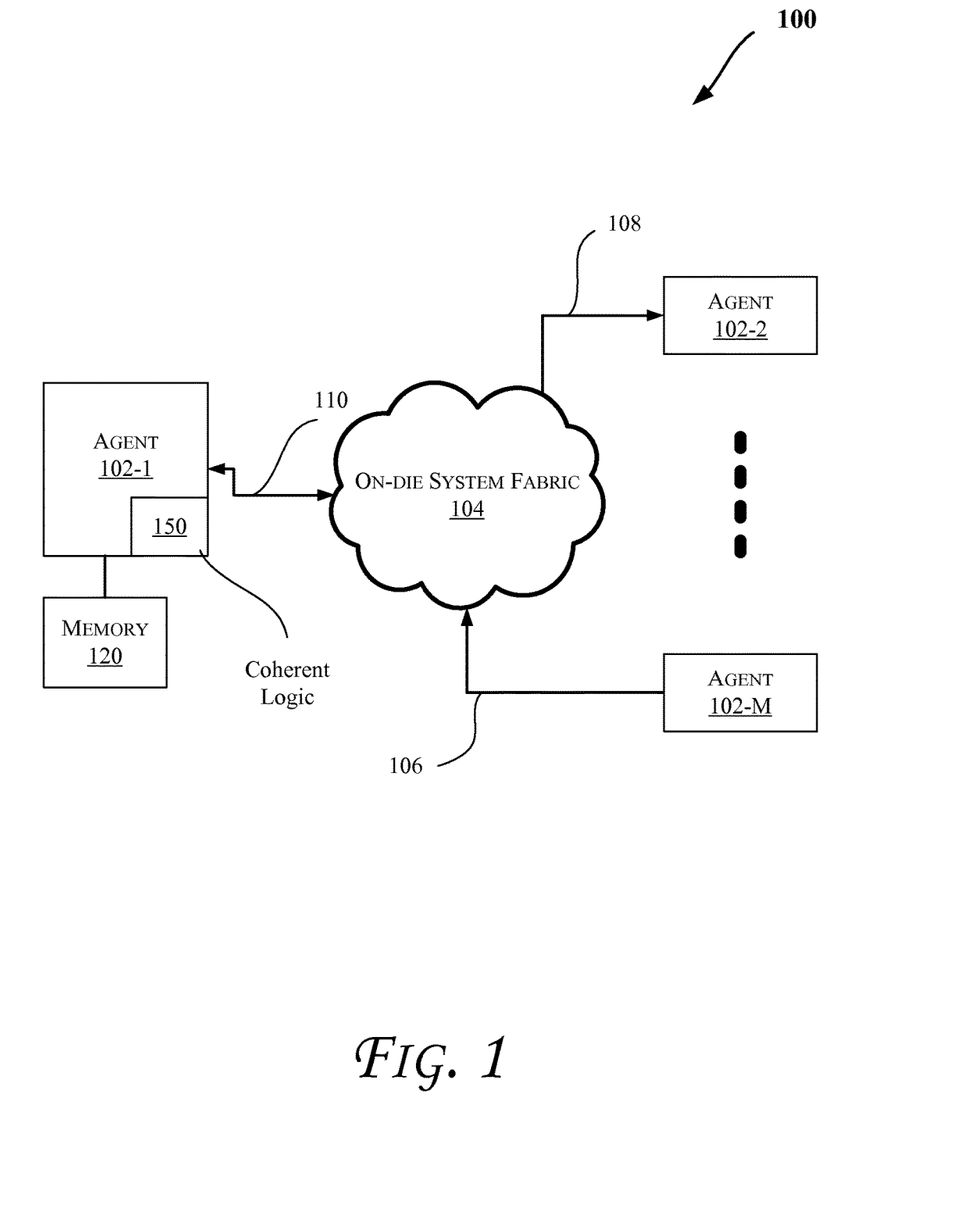
FIG. 1 illustrates a block diagram of an embodiment of a computing systems, which can be utilized to implement various embodiments discussed herein.

Moreover, the techniques discussed herein can be provided in various computing systems (e.g., including a non-mobile computing device such as a desktop, workstation, server, rack system, etc. or a mobile computing device such as a smartphone, tablet, UMPC (Ultra-Mobile Personal Computer), laptop computer, Ultrabook™ computing device, smart watch, smart glasses, etc.), including those discussed with reference to FIGS. 1-6. More particularly, FIG. 1 illustrates a block diagram of a computing system 100, according to an embodiment. The system 100 can include one or more agents 102-1 through 102-M (collectively referred to herein as "agents 102" or more generally "agent 102"). In an embodiment, one or more of the agents 102 can be any of components of a computing system, such as the computing systems discussed with reference to FIGS. 4-6.

As illustrated in FIG. 1, the agents 102 can communicate via a primary fabric 104, such as an On-die System Fabric (OSF). Hence, agents 102 and fabric 104 can be present on the same integrated circuit die in an embodiment. As discussed herein, "OSF" can refer to an On-Die System Fabric which is scalable, configurable, and/or product specific. For example, each of the agents 102 can be a bridge (e.g., for coupling to another fabric), IP (Intellectual Property) block, or another component of an electronic device which are coupled via the fabric 104. In one embodiment, the fabric 104 can include a computer network that allows various agents (such as computing devices) to communicate data. In an embodiment, the fabric 104 can include one or more interconnects (or interconnection networks) that communicate via a serial (e.g., point-to-point) link and/or a shared communication network (which can be configured as a ring in an embodiment). Each link can include one or more lanes. For example, some embodiments can facilitate component debug or validation on links that allow communication with Fully Buffered Dual in-line memory modules (FBD), e.g., where the FBD link is a serial link for coupling memory modules to a host controller device (such as a processor or memory hub). Debug information can be transmitted from the FBD channel host such that the debug information can be observed along the channel by channel traffic trace capture tools (such as one or more logic analyzers).

In one embodiment, the system 100 can support a layered protocol scheme, which can include a physical layer, a link layer, a routing layer, a transport layer, and/or a protocol layer. The fabric 104 can further facilitate transmission of data (e.g., in form of packets) from one protocol (e.g., caching processor or caching aware memory controller) to another protocol for a point-to-point or shared network. Also, in some embodiments, the fabric 104 can provide communication that adheres to one or more cache coherent protocols.

Furthermore, as shown by the direction of arrows in FIG. 1, the agents 102 can transmit and/or receive data via the fabric 104. Hence, some agents can utilize a unidirectional link while others can utilize a bidirectional link for communication. For instance, one or more agents (such as agent 102-M) can transmit data (e.g., via a unidirectional link 106), other agent(s) (such as agent 102-2) can receive data (e.g., via a unidirectional link 108), while some agent(s) (such as agent 102-1) can both transmit and receive data (e.g., via a bidirectional link 110). In some embodiments, links 106-110 are OSF interfaces that provide protocol and/or signaling to allow IP blocks to interoperate across multiple designs.

In an embodiment, OSF interfaces that couple agents 102 (e.g., links 106-110) can provide two ports referred to as primary channel and sideband channel. The primary channel can: (a) be a high performance interface for data transfer between peers and/or upstream; (b) support memory (e.g., 32 bit, 44 bit), input/output (IO or I/O), configuration, and message transactions; (c) support Peripheral Component Interconnect (PCI) Express ("PCIe", in accordance with PCI Express Base Specification 3.0, Revision 0.5, August 2008) ordering rules and/or enumeration; (d) support split transaction protocol; and/or (e) map PCIe header information. The sideband channel can: (i) provide a standard interface to communicate sideband (also referred to herein interchangeable as "out-of-band") information and eliminate special purpose wires; (ii) provide a point-to-point network; (iii) be used for status, power management, configuration shadowing, test modes, etc.; and/or (iv) be used for low performance (e.g., not intended for primary data transfers).

Additionally, at least one of the agents 102 can be a home agent and one or more of the agents 102 can be requesting or caching agents. Generally, requesting/caching agents send request(s) to a home node/agent for access to a memory address with which a corresponding "home agent" is associated. Further, in an embodiment, one or more of the agents 102 (only one shown for agent 102-1) can have access to a memory (which can be dedicated to the agent or shared with other agents) such as memory 120. In some embodiments, each (or at least one) of the agents 102 can be coupled to the memory 120 that is either on the same die as the agent or otherwise accessible by the agent. Also, as shown in FIG. 1, agents 102 include Coherent CDI logic 150 to facilitate snoop and/or GO message ordering, as will be further discussed herein, e.g., with reference to FIGS. 2-6.

Figure 2:
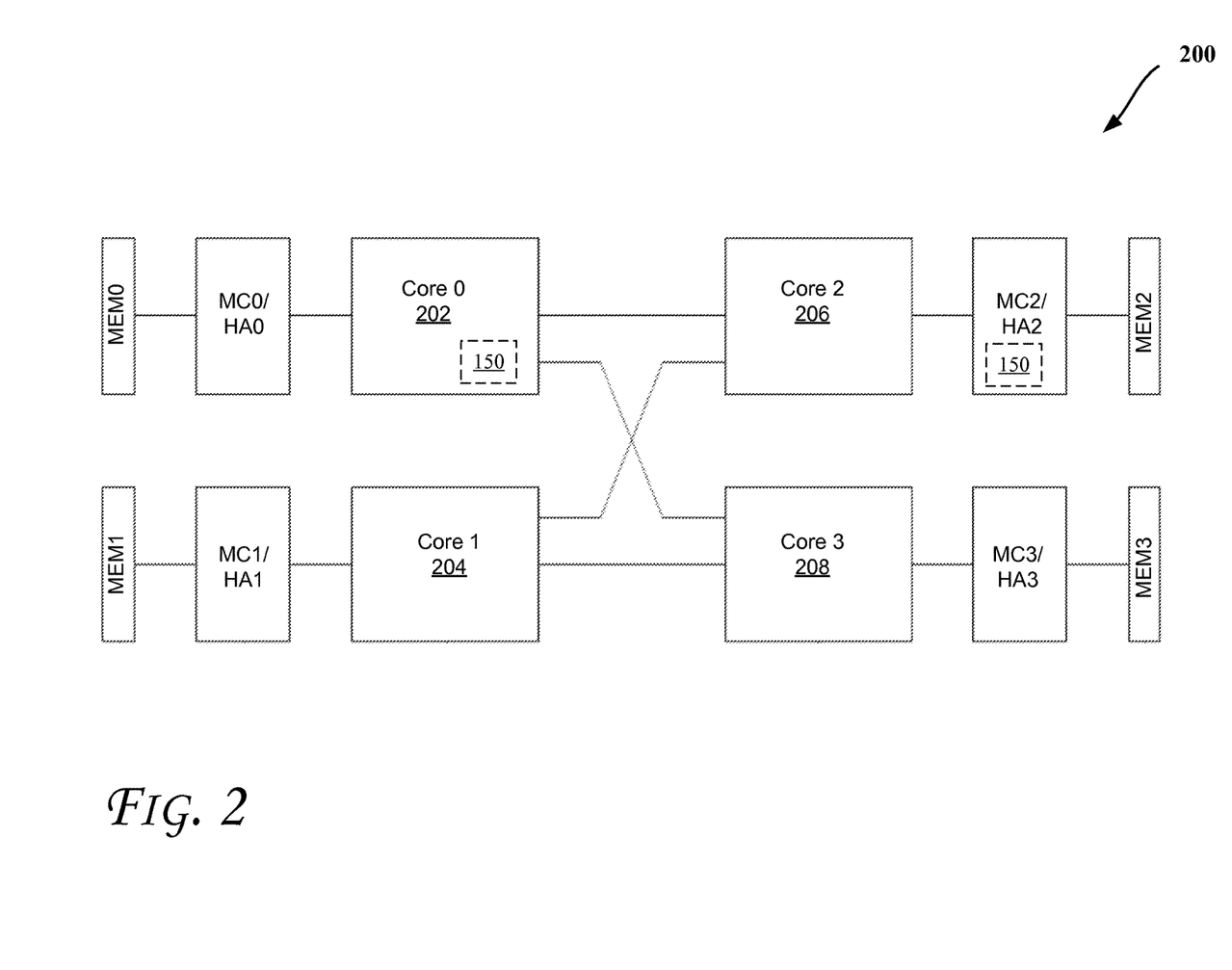
FIG. 2 illustrates a block diagram of an embodiment of a computing system, which can be utilized to implement one or more embodiments discussed herein.

FIG. 2 is a block diagram of a computing system 200 in accordance with an embodiment. System 200 includes a plurality of sockets 202-208 (four shown but some embodiments can have more or less socket). Each socket includes a processor. Also, various agents in the system 200 can communicate via logic 150. Even though logic 150 is only shown in items 202 and MC2/HA2, logic 150 can be provided in other agents of system 200. Further, more or less logic blocks can be present in a system depending on the implementation. Additionally, each socket is coupled to the other sockets via a point-to-point (PtP) link, or a differential interconnect, such as a Quick Path Interconnect (QPI), MIPI (Mobile Industry Processor Interface), etc. As discussed with respect the fabric 104 of FIG. 1, each socket is coupled to a local portion of system memory, e.g., formed by a plurality of Dual Inline Memory Modules (DIMMs) that include dynamic random access memory (DRAM).

In another embodiment, the network fabric can be utilized for any System on Chip (SoC or SOC) application, utilize custom or standard interfaces, such as, ARM compliant interfaces for AMBA (Advanced Microcontroller Bus Architecture), OCP (Open Core Protocol), MIPI (Mobile Industry Processor Interface), PCI (Peripheral Component Interconnect) or PCIe (Peripheral Component Interconnect express).

As shown in FIG. 2, each socket is coupled to a Memory Controller (MC)/Home Agent (HA) (such as MC0/HA0 through MC3/HA3). The memory controllers are coupled to a corresponding local memory (labeled as MEM0 through MEM3), which can be a portion of system memory (such as memory 912 of FIG. 9). In some embodiments, the memory controller (MC)/Home Agent (HA) (such as MC0/HA0 through MC3/HA3) can be the same or similar to agent 102-1 of FIG. 1 and the memory, labeled as MEM0 through MEM3, can be the same or similar to memory devices discussed with reference to any of the figures herein. Also, in one embodiment, MEM0 through MEM3 can be configured to mirror data, e.g., as master and slave. Also, one or more components of system 200 can be included on the same integrated circuit die in some embodiments.

Furthermore, one implementation (such as shown in FIG. 2) is for a socket glueless configuration with mirroring. For example, data assigned to a memory controller (such as MC0/HA0) is mirrored to another memory controller (such as MC3/HA3) over the PtP links.

Figure 3:
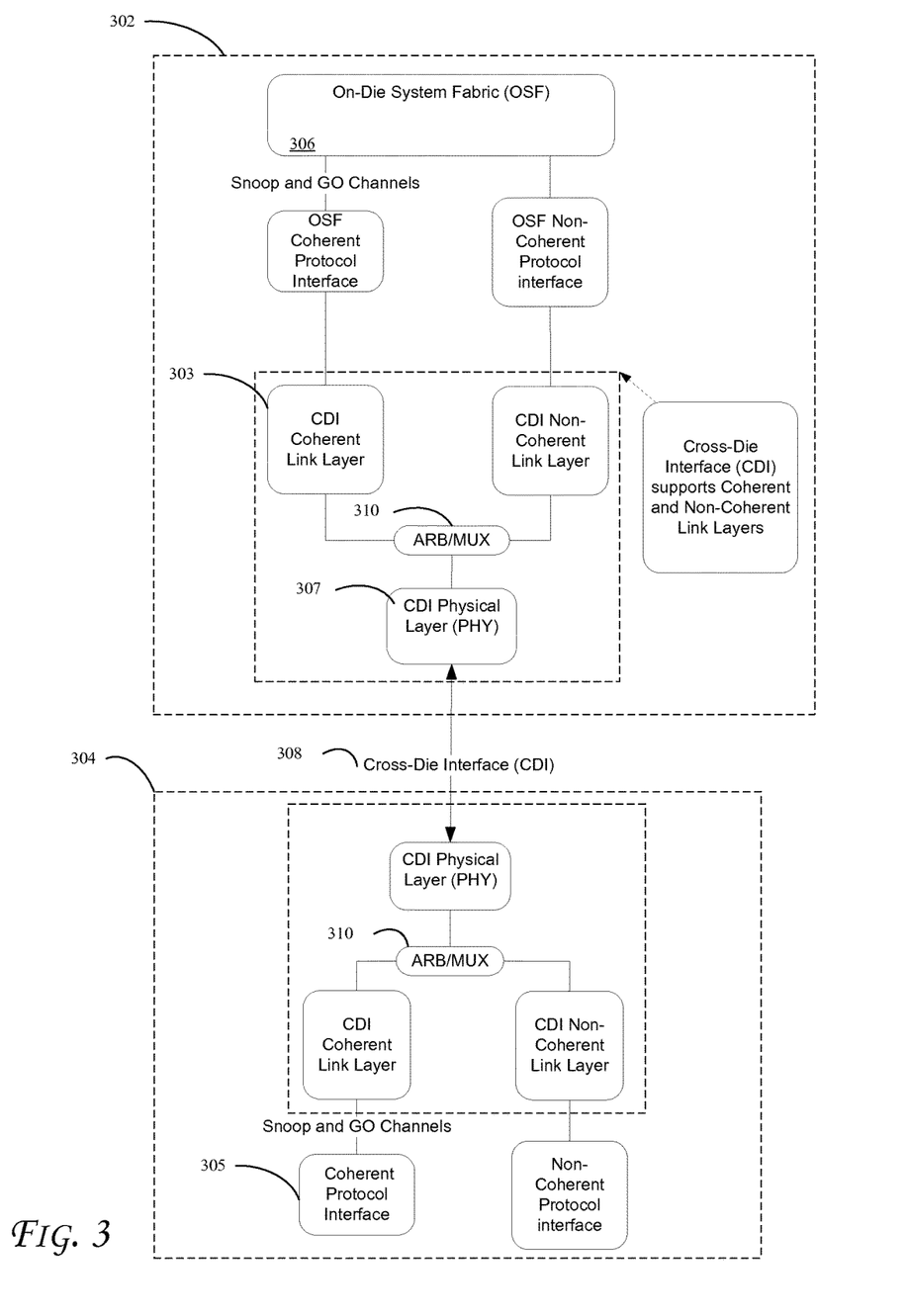
FIG. 3 illustrates a block diagram of a multiple-die interconnect configuration, according to an embodiment.

FIG. 3 illustrates a block diagram of a multiple-die interconnect configuration, according to one embodiment. Also, logic 150 can include one or more of the components shown in FIG. 3 to facilitate snoop/GO message ordering as discussed herein with reference to some embodiments. In an embodiment, the Cross-Die Interface (CDI) 308 of FIG. 3 is used to couple a plurality of integrated circuit dies/devices.

In some embodiments, a link with two (e.g., unique) interfaces between a first Integrated Circuit (IC) die 302 and a second IC die 304 are provided. One of these interfaces is to the On-Die System Fabric (OSF) 306 (which may be the same or similar to OSF 102 of FIG. 1), which uses a coherent protocol and a non-coherent protocol between an attached device and the OSF 306. The OSF includes multiple interfaces in an embodiment (and can be over 2000 wires wide in some implementations). The other interface is to a Cross-Die Interface (CDI) 308, which can be 50 lanes wide. In one embodiment CDI packs coherent protocol interface 305 messages into a 400 bit Flit. One embodiment efficiently packs coherent CDI messages while still adhering to snoop and/or GO message ordering requirements. Generally, the ordering requirement is that GO's can pass snoops, but snoops push GO's.

One previous solution would be to extend all message interfaces of the OSF (which can be very impractical). For example, on 50 lanes and an 8UI (or 8 Unit Interval) interface (or in 400 bit flit), any message communication received from the OSF can be packed and forwarded to the secondary die (which can include a several-thousand wire interface). For coherent CDI over the OSF 306, most messages destined to a single receiver have no order except snoops and GOs. Another solution is to send a single message at a time over a flit, which can be very inefficient.

As previously mentioned, the coherent CDI rule with respect to ordering of snoop and GO messages is that GO messages can pass snoops, but snoop messages do not pass GO messages to the same address (otherwise, coherency and the TSO memory consistency model can be broken). One item that makes this complex is that snoop messages contain an address, whereas GO messages do not. So, all GO/Snoop messages need to be treated as potentially conflicting. To this end, an embodiment utilizes epoch bits and packing rules of a flit to efficiently pack the coherent CDI flit to ensure the absence of any conflicting message in a flit. Unpacking rules can then be used to recreate the epoch bits at the receiver end to maintain the snoop/GO ordering rules.

Further, some embodiments allow for packing as many snoop and/or GO messages in a single flit, while guaranteeing the coherent CDI ordering without utilizing any additional bits in the flit message. Moreover, such techniques avoid burning or wasting any additional bits in the flit for the TX/RX (transmit/receive) circuitry to stay in synchronization, as well as, allow for the efficient packing of the flit to place as many messages in the flit as possible.

Another method to guarantee order requirement of coherent CDI involves ordering the messages in a single FIFO (First-In, First-Out) buffer, but such a solution consumes a much larger combined structure or multiple bits (also CDI is much narrower than a OSF interconnect so the larger structure or multiple bits would slow the link speed due to latency associated with accessing the larger structure and/or communicating the additional information). By contrast, some embodiments only use two bits in a CDI TX/RX logic to track potential dependencies. These two bits are not sent between the TX/RX logic but reside in the storage structures on each side. This approach provides a more simple solution that involves a local decision/access instead of having to transmit this information over a link, e.g., resulting in more reliability, power consumption reduction, reduced latency, and/or increased speed. At the RX logic as the GO and snoop messages are unpacked these two bits (also referred to herein sometimes as "epoch bits") are regenerated prior to transmission on the Coherent Protocol Interface 305.

Referring to FIG. 3, a Coherent Protocol interface is generally shown on the left side and an Non-Coherent Protocol interface is shown on the right side between a primary IC 302 and a secondary IC 304. In FIG. 3, "ARB/MUX" 310 refers to arbitration logic/multiplexer to arbitrate between multiple protocol link-layers, and in one embodiment outputs of Coherent Protocol link-layer and Non-Coherent Protocol Link Layer as shown in FIG. 3. The CDI physical (PHY) layer 307 transports the protocol that is multiplexed at a flit granularity.

In some embodiments, one or more of the following configuration/rules (developed for the CDI Coherent pipe between primary and secondary ICs) ensure snoop/GO ordering:

(1) at the OSF 302 interface, separate Snoop/GO FIFOs are provided with an additional bit-per-entry to track Snoop/GO epoch and one more bit to track the current epoch;
  (a) epoch bits are generated on input to the queue and read to determine packing/sending;
  (b) noting that GO messages do not carry an address so the logic (e.g., logic 150) has no idea if a snoop message conflicts with an outstanding GO. For this reason CDI Coherent Protocol requires snoops to NOT pass a previously issued GO;

(2) CDI's implicit flit order—in building an Coherent CDI flit, by definition messages within flit are not ordered (i.e., all messages in a single flit have no ordering requirement and can be completely unpacked at the receiver logic and sent to the device in any desired order).

The scheme works as follows. Snoop (Req) and GO (Rsp) FIFOs are separate with an additional array of Epoch bits per entry. The GO epoch (GO_epoch) or Snoop epoch (Snp_epoch) bit is assigned a binary value to a block of GO or Snoop (respectively) that do not need to be ordered amongst themselves. There is also an additional bit (Rbit or "Remember bit") to remember what epoch we currently/last popped from GO FIFO.

In one embodiment, the bits are manipulated according to these rules going into the Transmit (Tx)/Receive (Rx) FIFO:
  Initially Snp_epoch=1 if a GO never received in the previous or same cycle, else 0
  Initially GO_epoch=1
  Toggle Snp_epoch if GO was written last time a Snoop was written or if last time a GO was written there was no Snoop written
  Toggle GO_epoch if a Snoop is also written this cycle or if the last time a Snoop was written there was no GO written In one embodiment, to determine whether a GO came last since last Snoop or whether a Snoop came since last GO we save the state of each write enable signal for the queues. Request write enable (req_WrEn) and Response write enable (rsp_WrEn) are captured when either is asserted. Otherwise last_req_WrEn and last_rsp_WrEn flops hold their state. In this way "last" means last time something was written. The epoch bits to be written to the queue are named next_snp_epoch and next_GO_epoch. In some embodiments, they are determined by TABLE 1: Snp_epoch generation and TABLE 2: GO_epoch generation.

TABLE 1

Snp_epoch generation

| snp_wrEn | GO_wrEn | last_snp_wrEn | last_GO_wrEn | next_snp_epoch | |
|---|---|---|---|---|---|
| 1 | 0 | 0 | 0 | 1 | first Snp, never a GO |
| 1 | 0 | 0 | 1 | toggle | GO came since last Snp |
| 1 | 0 | 1 | 0 | no toggle | no GO since last Snp |
| 1 | 0 | 1 | 1 | toggle | Go with last Snp |
| 1 | 1 | x | x | no toggle | GO is here this cycle |

TABLE 2

GO_epoch generation

| snp_wrEn | GO_wrEn | last_snp_wrEn | last_GO_wrEn | next GO epoch | |
|---|---|---|---|---|---|
| 0 | 1 | 0 | 0 | 1 | first GO |
| 0 | 1 | 0 | 1 | no toggle | same epoch |
| 0 | 1 | 1 | 0 | toggle | Snp came since last GO |
| 0 | 1 | 1 | 1 | no toggle | Snp was last cycle with GO and not this cycle |
| 1 | 1 | x | x | toggle | Snp is here this cycle |

In one embodiment, when reading the Tx/Rx FIFO, the rules for establishing the ordering are as follows:
  Rbit is set to GO_epoch last sent;
  if epoch same then Snoop may pass GO;
  else if Rbit==Snp_epoch then Snoop may pass GO('s);
  else Snoop is delayed until after GO('s) is(are) issued; and
  Before changing epoch need to send all in the current epoch.

An example is provided in the following Table 3 in accordance with some embodiments. This table shows a sample order of Snoop (S0, S1, S2, etc.) and GO (G0, G1, G2, etc.) appearing on the OSF and how the logic (e.g., logic 150 and/or 303) assigns the Snp_epoch and GO_epoch bits.

For initial value, the first GO_epoch is always 1, by definition. The first Snp_epoch=1 if a GO has never received, else 0. In the example, the Snp_epoch at time t=0 is assigned to 1. At t=1, a GO (G0) arrives without a Snoop. This GO is also assigned a 1 because it has no ordering requirement relative to the Snoop and is therefore in the same epoch. At t=2, both a Snoop (S1) and GO (G1) arrive. The Snoop must be assigned a new epoch so that it will be ordered behind the previous GO. The GO is given this epoch also so that it does not block the Snoop. At t=4, the Snp_epoch for Snoop (S2) must be toggled so that it is ordered behind the GO that came at t=3. The rest of the example can be built using the rules above.

Table 3 shows examples of Snoop (S) and GO (G) message arrival and corresponding tracking in Snp and GO FIFO according to an embodiment:

TABLE 3

| | FIFO Sequence | | | | | | |
|---|---|---|---|---|---|---|---|
| | 6 | 5 | 4 | 3 | 2 | 1 | 0 |
| Snp FIFO | S6 | S5 | S4 | S3 | S2 | S1 | S0 |
| Snp_Epoch bits | 1 | 0 | 0 | 0 | 1 | 0 | 1 |
| GO FIFO | | | G4 | G3 | G2 | G1 | G0 |
| GO_Epoch bits | | | 0 | 1 | 0 | 0 | 1 |

| Time | Snp | GO |
|---|---|---|
| 0 | S0 | |
| 1 | | G0 |
| 2 | S1 | G1 |
| 3 | | G2 |
| 4 | S2 | |
| 5 | | G3 |
| 6 | S3 | |
| 7 | S4 | |
| 8 | S5 | |
| 9 | | G4 |
| 10 | S6 | |

In an embodiment, Coherent CDI flits are packed based on the following rules:
  When order matters according to the rules above, put Snoop in later Flit; and To improve efficiency, group snoops and GO messages in different flits For this example, the Remember bit (Rbit) is set to a 1 on reception of 1st GO message. Snoop S0 and G0 can be sent in the same flit, however S1, G1 and G2 cannot. Since those are all the messages with epoch 0, S1, G1 and G2 are allowed to be sent in a subsequent flit (note whether they will actually be sent depends on other flit packing rules). The R-bit would be changed to 0. Again, S2 cannot be sent in that flit since it has a Snp_epoch (1) that does not match the R-bit. S2 and G3 are allowed to be sent in a subsequent flit. S3, S4, S5 and G4 are allowed to be sent in a following flit, but S6 cannot since its epoch doesn't match the R-bit (0) since it needs to be ordered with respect to G4.

In the Rx data path, the flit is unpacked and the epoch bits are generated and stored with the Snoop and GO messages in the Rx FIFOs in accordance to the above-discussed rules for writing to the Rx FIFO. The order is based on the flit in which they are packed. Snoop/GO messages within a flit are unordered, but we would set the same value for Snp_Epoch and GO_Epoch for Snoop/GO messages within a flit. Ordering occurs between flits. When the Rx FIFOs are read, the epoch bits are used to return the Snoop/GO messages in the correct order to the receiver logic.

Figure 4:
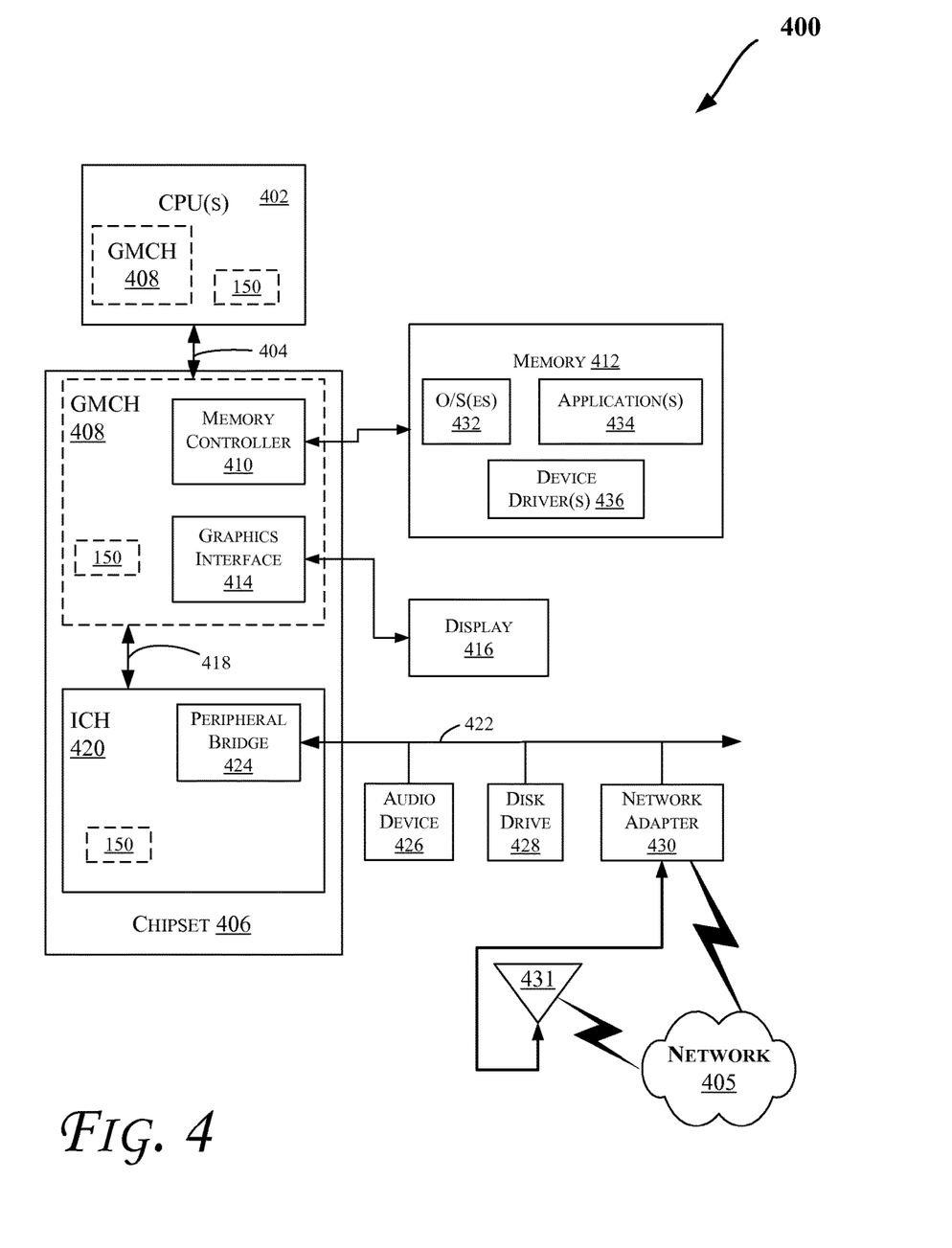
FIG. 4 illustrates a block diagram of an embodiment of a computing system, which can be utilized to implement one or more embodiments discussed herein.

FIG. 4 illustrates a block diagram of an embodiment of a computing system 400. One or more of the agents 102 of FIG. 1 can comprise one or more components of the computing system 400. Also, various components of the system 400 can include logic 150 as illustrated in FIG. 4. However, logic 150 can be provided in locations throughout the system 400, including or excluding those illustrated. The computing system 400 can include one or more central processing unit(s) (CPUs) 402 (which can be collectively referred to herein as "processors 402" or more generically "processor 402") coupled to an interconnection network (or bus) 404. The operations discussed with reference to FIGS. 1-3 can be performed by one or more components of the system 400.

The processors 402 can be any type of processor such as a general purpose processor, a network processor (which can process data communicated over a computer network 405), etc. (including a reduced instruction set computer (RISC) processor or a complex instruction set computer (CISC)). Moreover, the processors 402 can have a single or multiple core design. The processors 402 with a multiple core design can integrate different types of processor cores on the same integrated circuit (IC) die. Also, the processors 402 with a multiple core design can be implemented as symmetrical or asymmetrical multiprocessors.

The processor 402 can include one or more caches, which can be private and/or shared in various embodiments. Generally, a cache stores data corresponding to original data stored elsewhere or computed earlier. To reduce memory access latency, once data is stored in a cache, future use can be made by accessing a cached copy rather than prefetching or recomputing the original data. The cache(s) can be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 400. Additionally, such cache(s) can be located in various locations (e.g., inside other components to the computing systems discussed herein, including systems of FIG. 1, 2, 3, or 5).

A chipset 406 can additionally be coupled to the interconnection network 404. Further, the chipset 406 can include a graphics memory control hub (GMCH) 408. The GMCH 408 can include a memory controller 410 that is coupled to a memory 412. The memory 412 can store data, e.g., including sequences of instructions that are executed by the processor 402, or any other device in communication with components of the computing system 400. Also, in one embodiment, the memory 412 can include one or more volatile storage (or memory) devices such as random access memory (RAM), dynamic RAM (DRAM), synchronous DRAM (SDRAM), static RAM (SRAM), etc. Nonvolatile memory can also be utilized such as a hard disk. Additional devices can be coupled to the interconnection network 404, such as multiple processors and/or multiple system memories.

The GMCH 408 can further include a graphics interface 414 coupled to a display device 416 (e.g., via a graphics accelerator in an embodiment). In one embodiment, the graphics interface 414 can be coupled to the display device 416 via an Accelerated Graphics Port (AGP) or Peripheral Component Interconnect (PCI) (or PCI express (PCIe) interface). In an embodiment, the display device 416 (such as a flat panel display) can be coupled to the graphics interface 414 through, for example, a signal converter that translates a digital representation of an image stored in a storage device such as video memory or system memory (e.g., memory 412) into display signals that are interpreted and displayed by the display 416.

As shown in FIG. 4, a hub interface 418 can couple the GMCH 408 to an input/output control hub (ICH) 420. The ICH 420 can provide an interface to input/output (I/O) devices coupled to the computing system 400. The ICH 420 can be coupled to a bus 422 through a peripheral bridge (or controller) 424, such as a Peripheral Component Interconnect (PCI) bridge that can be compliant with the PCIe specification, a universal serial bus (USB) controller, etc. The bridge 424 can provide a data path between the processor 402 and peripheral devices. Other types of topologies can be utilized. Also, multiple buses can be coupled to the ICH 420, e.g., through multiple bridges or controllers. Further, the bus 422 can comprise other types and configurations of bus systems. Moreover, other peripherals coupled to the ICH 420 can include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 422 can be coupled to an audio device 426, one or more disk drive(s) 428, and a network adapter/interface 430 (which can be a NIC in an embodiment). In one embodiment, the network adapter 430 or other devices coupled to the bus 422 can communicate with the chipset 406. Network adapter 430 can communicated with various components via a wired or wireless interface. As shown in FIG. 4, network adapter 430 can be coupled to an antenna 431 to wirelessly (e.g., via an Institute of Electrical and Electronics Engineers (IEEE) 802.11 interface (including IEEE 802.11a/b/g/n/ac, etc.), cellular interface, 3G, 11G, LPE, etc.) communicate with the network 403. Other devices can communicate via the bus 422. Also, various components (such as the network adapter 430) can be coupled to the GMCH 408 in some embodiments. In addition, the processor 402 and the GMCH 408 can be combined to form a single chip. In an embodiment, the memory controller 410 can be provided in one or more of the CPUs 402. Further, in an embodiment, GMCH 408 and ICH 420 can be combined into a Peripheral Control Hub (PCH).

Additionally, the computing system 400 can include volatile and/or nonvolatile memory (or storage). For example, nonvolatile memory can include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 412 can include one or more of the following in an embodiment: an operating system (O/S) 432, application 434, and/or device driver 436. The memory 412 can also include regions dedicated to Memory Mapped I/O (MMIO) operations. Programs and/or data stored in the memory 412 can be swapped into the disk drive 428 as part of memory management operations. The application(s) 434 can execute (e.g., on the processor(s) 402) to communicate one or more packets with one or more computing devices coupled to the network 405. In an embodiment, a packet can be a sequence of one or more symbols and/or values that can be encoded by one or more electrical signals transmitted from at least one sender to at least on receiver (e.g., over a network such as the network 405). For example, each packet can have a header that includes various information which can be utilized in routing and/or processing the packet, such as a source address, a destination address, packet type, etc. Each packet can also have a payload that includes the raw data (or content) the packet is transferring between various computing devices over a computer network (such as the network 405).

In an embodiment, the application 434 can utilize the O/S 432 to communicate with various components of the system 400, e.g., through the device driver 436. Hence, the device driver 436 can include network adapter 430 specific commands to provide a communication interface between the O/S 432 and the network adapter 430, or other I/O devices coupled to the system 400, e.g., via the chipset 406.

In an embodiment, the O/S 432 can include a network protocol stack. A protocol stack generally refers to a set of procedures or programs that can be executed to process packets sent over a network 405, where the packets can conform to a specified protocol. For example, TCP/IP (Transport Control Protocol/Internet Protocol) packets can be processed using a TCP/IP stack. The device driver 436 can indicate the buffers in the memory 412 that are to be processed, e.g., via the protocol stack.

The network 405 can include any type of computer network. The network adapter 430 can further include a direct memory access (DMA) engine, which writes packets to buffers (e.g., stored in the memory 412) assigned to available descriptors (e.g., stored in the memory 412) to transmit and/or receive data over the network 405. Additionally, the network adapter 430 can include a network adapter controller, which can include logic (such as one or more programmable processors) to perform adapter related operations. In an embodiment, the adapter controller can be a MAC (media access control) component. The network adapter 430 can further include a memory, such as any type of volatile/nonvolatile memory (e.g., including one or more cache(s) and/or other memory types discussed with reference to memory 412).

Figure 5:
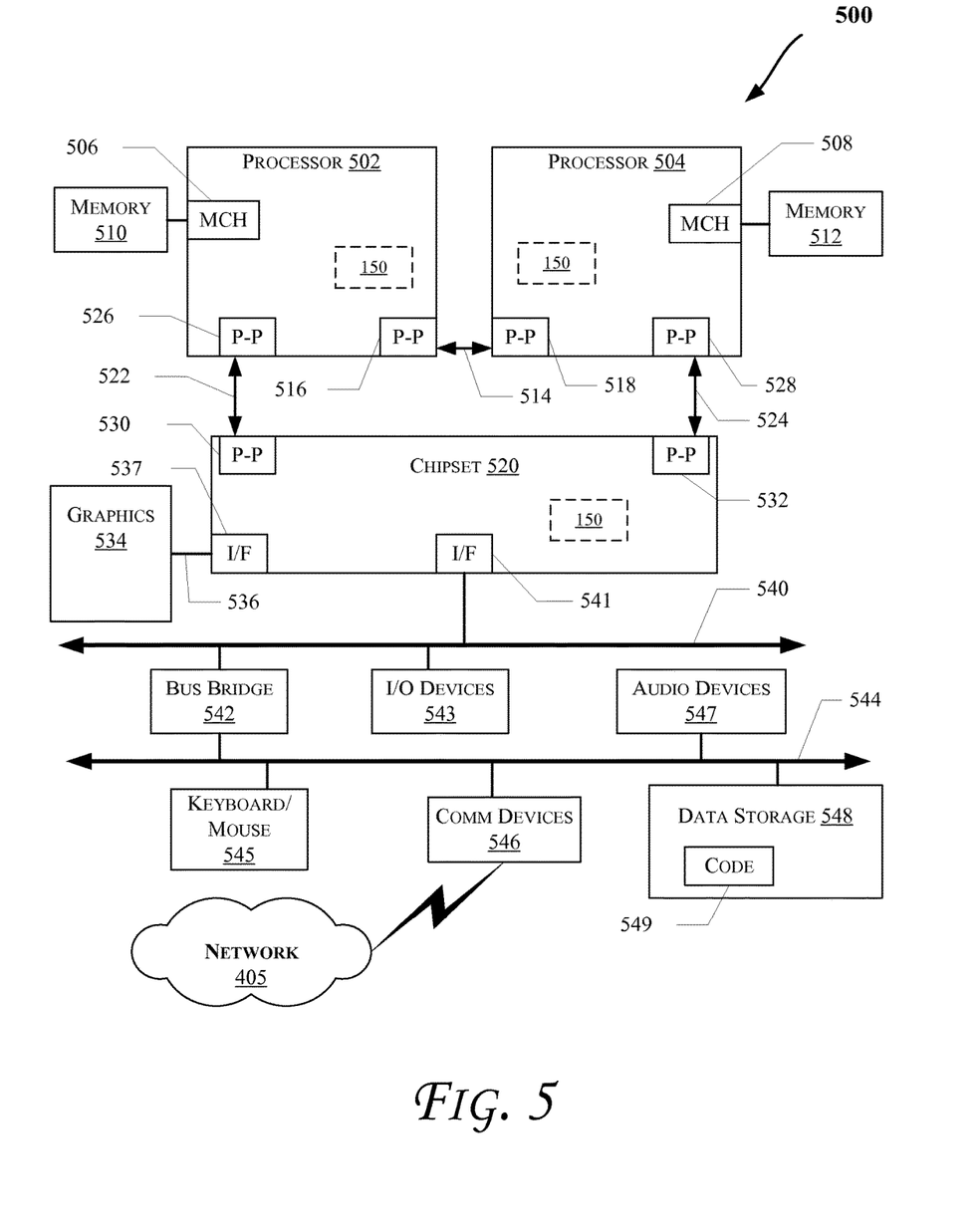
FIG. 5 illustrates a block diagram of an embodiment of a computing system, which can be utilized to implement one or more embodiments discussed herein.

FIG. 5 illustrates a computing system 500 that is arranged in a point-to-point (PtP) configuration, according to an embodiment. In particular, FIG. 5 shows a system where processors, memory, and input/output devices are interconnected by a number of point-to-point interfaces. The operations discussed with reference to FIGS. 1-4 can be performed by one or more components of the system 500.

As illustrated in FIG. 5, the system 500 can include several processors, of which only two, processors 502 and 504 are shown for clarity. The processors 502 and 504 can each include a local Memory Controller Hub (MCH) 506 and 508 to enable communication with memories 510 and 512. The memories 510 and/or 512 can store various data such as those discussed with reference to the memory 512 of FIG. 5. As shown in FIG. 5, the processors 502 and 504 (or other components of system 500 such as chipset 520, I/O devices 543, etc.) can also include one or more cache(s) such as those discussed with reference to FIGS. 1-4.

In an embodiment, the processors 502 and 504 can be one of the processors 502 discussed with reference to FIG. 5. The processors 502 and 504 can exchange data via a point-to-point (PtP) interface 514 using PtP interface circuits 516 and 518, respectively. Also, the processors 502 and 504 can each exchange data with a chipset 520 via individual PtP interfaces 522 and 524 using point-to-point interface circuits 526, 528, 530, and 532. The chipset 520 can further exchange data with a high-performance graphics circuit 534 via a high-performance graphics interface 536, e.g., using a PtP interface circuit 537.

In at least one embodiment, logic 150 can be provided in one or more of the processors 502, 504 and/or chipset 520. Other embodiments, however, can exist in other circuits, logic units, or devices within the system 500 of FIG. 5. Furthermore, other embodiments can be distributed throughout several circuits, logic units, or devices illustrated in FIG. 5. For example, various components of the system 500 can include the logic 150 of FIG. 1. However, logic 150 can be provided in locations throughout the system 500, including or excluding those illustrated.

The chipset 520 can communicate with the bus 540 using a PtP interface circuit 541. The bus 540 can have one or more devices that communicate with it, such as a bus bridge 542 and I/O devices 543. Via a bus 544, the bus bridge 542 can communicate with other devices such as a keyboard/mouse 545, communication devices 546 (such as modems, network interface devices, or other communication devices that can communicate with the computer network 505), audio I/O device, and/or a data storage device 548. The data storage device 548 can store code 549 that can be executed by the processors 502 and/or 504.

Figure 6:
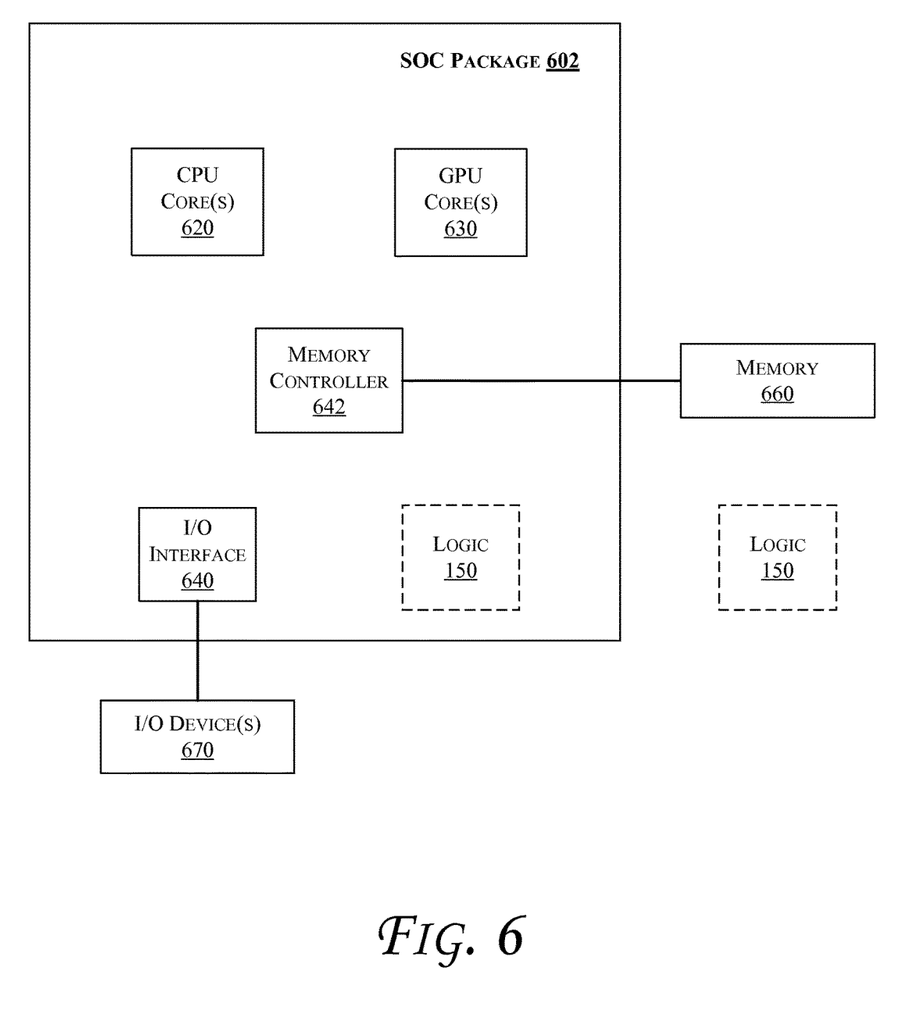
FIG. 6 illustrates a block diagram of an System On Chip (SOC) package in accordance with an embodiment.

In some embodiments, one or more of the components discussed herein can be embodied as a System On Chip (SOC) device. FIG. 6 illustrates a block diagram of an SOC package in accordance with an embodiment. As illustrated in FIG. 6, SOC 602 includes one or more Central Processing Unit (CPU) cores 620, one or more Graphics Processor Unit (GPU) cores 630, an Input/Output (I/O) interface 640, and a memory controller 642. Various components of the SOC package 602 can be coupled to an interconnect or bus such as discussed herein with reference to the other figures. Also, the SOC package 602 can include more or less components, such as those discussed herein with reference to the other figures. Further, each component of the SOC package 620 can include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 (which can be similar to or the same as memory discussed herein with reference to the other figures) via the memory controller 642. In an embodiment, the memory 660 (or a portion of it) can be integrated on the SOC package 602.

The I/O interface 640 can be coupled to one or more I/O devices 670, e.g., via an interconnect and/or bus such as discussed herein with reference to other figures. I/O device(s) 670 can include one or more of a keyboard, a mouse, a touchpad, a display, an image/video capture device (such as a camera or camcorder/video recorder), a touch screen, a speaker, or the like. Furthermore, SOC package 602 can include/integrate the logic 150 in an embodiment. Alternatively, the logic 150 can be provided outside of the SOC package 602 (i.e., as a discrete logic).

The following examples pertain to further embodiments. Example 1 includes an apparatus comprising: logic to determine an order of a snoop message and a completion message to be exchanged between a first integrated circuit die and a second integrated circuit die based at least on status of two bits, wherein the first integrated circuit die and the second integrated circuit die are to be coupled through a first interface and a second interface, wherein the snoop message and the completion message are to be exchanged over at least one of the first interface and the second interface. Example 2 includes the apparatus of example 1, wherein the first interface is to comprise an On-Die Fabric (OSF) interface that is to utilize a coherent Cross-Die Interface (CDI). Example 3 includes the apparatus of example 2, wherein the coherent CDI is to provide a coherence protocol for communication between an attached device and the OSF interface. Example 4 includes the apparatus of example 1, wherein the second interface is to comprise a non-coherent CDI. Example 5 includes the apparatus of example 1, wherein the two bits are to comprise a snoop epoch bit and a completion epoch bit. Example 6 includes the apparatus of example 1, wherein the snoop message is to comprise an address and the completion message is to exclude an address. Example 7 includes the apparatus of example 1, wherein the logic, a processor having one or more processor cores, and memory are on a same integrated device. Example 8 includes the apparatus of example 1, wherein at least one of the first interface and the second interface is to comprise a point-to-point link.

Example 9 includes a method comprising: determining an order of a snoop message and a completion message to be exchanged between a first integrated circuit die and a second integrated circuit die based at least on status of two bits, wherein the first integrated circuit die and the second integrated circuit die are coupled through a first interface and a second interface, wherein the snoop message and the completion message are to be exchanged over at least one of the first interface and the second interface. Example 10 includes the method of example 9, wherein the first interface comprises an On-Die Fabric (OSF) interface that utilizes a coherent Cross-Die Interface (CDI). Example 11 includes the method of example 10, further comprising the coherent CDI providing a coherence protocol for communication between an attached device and the OSF interface. Example 12 includes the method of example 9, wherein the second interface comprises a non-coherent link layer. Example 13 includes the method of example 9, wherein the two bits comprise a snoop epoch bit and a completion epoch bit. Example 14 includes the method of example 9, wherein the snoop message comprises an address and the completion message excludes an address.

Example 15 includes a system comprising: a processor having one or more processor cores; a display device couple to the processor; and logic to determine an order of a snoop message and a completion message to be exchanged between a first integrated circuit die and a second integrated circuit die based at least on status of two bits, wherein the first integrated circuit die and the second integrated circuit die are to be coupled through a first interface and a second interface, wherein the snoop message and the completion message are to be exchanged over at least one of the first interface and the second interface. Example 16 includes the system of example 15, wherein the first interface is to comprise an On-Die Fabric (OSF) interface that is to utilize a coherent Cross-Die Interface (CDI). Example 17 includes the system of example 16, wherein the coherent CDI is to provide a coherence protocol for communication between an attached device and the OSF interface. Example 18 includes the system of example 15, wherein the second interface is to comprise a non-coherent link layer. Example 19 includes the system of example 15, wherein the two bits are to comprise a snoop epoch bit and a completion epoch bit. Example 20 includes the system of example 15, wherein the snoop message is to comprise an address and the completion message is to exclude an address. Example 21 includes the system of example 15, wherein the logic, the processor having one or more processor cores, and memory are on a same integrated device. Example 22 includes the system of example 15, wherein at least one of the first interface and the second interface is to comprise a point-to-point link.

Example 23 includes a computer-readable medium comprising one or more instructions that when executed on a processor configure the processor to perform one or more operations to: determine an order of a snoop message and a completion message to be exchanged between a first integrated circuit die and a second integrated circuit die based at least on status of two bits, wherein the first integrated circuit die and the second integrated circuit die are coupled through a first interface and a second interface, wherein the snoop message and the completion message are to be exchanged over at least one of the first interface and the second interface. Example 24 includes the computer-readable medium of example 23, wherein the first interface comprises an On-Die Fabric (OSF) interface that utilizes a coherent Cross-Die Interface (CDI). Example 25 includes the computer-readable medium of example 24, further comprising one or more instructions that when executed on the processor configure the processor to perform one or more operations to cause the coherent CDI to provide a coherence protocol for communication between an attached device and the OSF interface.

Example 26 includes an apparatus comprising means to perform a method as set forth in any preceding example.

Example 27 comprises machine-readable storage including machine-readable instructions, when executed, to implement a method or realize an apparatus as set forth in any preceding example.

In various embodiments, the operations discussed herein, e.g., with reference to FIGS. 1-6, can be implemented as hardware (e.g., circuitry), software, firmware, microcode, or combinations thereof, which can be provided as a computer program product, e.g., including a tangible (e.g., non-transitory) machine-readable or (e.g., non-transitory) computer-readable medium having stored thereon instructions (or software procedures) used to program a computer to perform a process discussed herein. Also, the term "logic" can include, by way of example, software, hardware, or combinations of software and hardware. The machine-readable medium may include a storage device such as those discussed with respect to FIGS. 1-6. Additionally, such computer-readable media may be downloaded as a computer program product, wherein the program may be transferred from a remote computer (e.g., a server) to a requesting computer (e.g., a client) through data signals in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic to determine an order of a snoop message and a completion message to be exchanged between a first integrated circuit die and a second integrated circuit die based at least on status of two bits,
   wherein the first integrated circuit die and the second integrated circuit die are to be coupled through a first interface and a second interface, wherein the snoop message and the completion message are to be exchanged over at least one of the first interface and the second interface, wherein the logic is to allow the completion message to pass the snoop message, wherein the logic is to disallow the snoop message to pass the completion message to a same address, wherein a coherent flit is to be packed based on: one or more epoch bits and one or more packing rules, wherein packing of the coherent flit is to ensure absence of a conflicting message in the coherent flit.

2. The apparatus of claim 1, wherein the first interface is to comprise an On-Die Fabric (OSF) interface that is to utilize a coherent Cross-Die Interface (CDI).

3. The apparatus of claim 2, wherein the coherent CDI is to provide a coherence protocol for communication between an attached device and the OSF interface.

4. The apparatus of claim 1, wherein the second interface is to comprise a non-coherent CDI.

5. The apparatus of claim 1, wherein the two bits are to comprise a snoop epoch bit and a completion epoch bit.

6. The apparatus of claim 1, wherein the snoop message is to comprise an address and the completion message is to exclude an address.

7. The apparatus of claim 1, wherein the logic, a processor having one or more processor cores, and memory are on a same integrated device.

8. The apparatus of claim 1, wherein at least one of the first interface and the second interface is to comprise a point-to-point link.

9. The apparatus of claim 1, wherein the one or more epoch bits are to comprise the two bits.

10. A method comprising:
  determining an order of a snoop message and a completion message to be exchanged between a first integrated circuit die and a second integrated circuit die based at least on status of two bits,
  wherein the first integrated circuit die and the second integrated circuit die are coupled through a first interface and a second interface, wherein the snoop message and the completion message are to be exchanged over at least one of the first interface and the second interface, wherein the completion message is allowed to pass the snoop message, wherein the snoop message is disallowed to pass the completion message to a same address, wherein a coherent flit is packed based on: one or more epoch bits and one or more packing rules, wherein packing of the coherent flit ensures absence of a conflicting message in the coherent flit.

11. The method of claim 10, wherein the first interface comprises an On-Die Fabric (OSF) interface that utilizes a coherent Cross-Die Interface (CDI).

12. The method of claim 11, further comprising the coherent CDI providing a coherence protocol for communication between an attached device and the OSF interface.

13. The method of claim 10, wherein the second interface comprises a non-coherent link layer.

14. The method of claim 10, wherein the two bits comprise a snoop epoch bit and a completion epoch bit.

15. The method of claim 10, wherein the snoop message comprises an address and the completion message excludes an address.

16. A system comprising:
  a processor having one or more processor cores;
  a display device couple to the processor; and
  logic to determine an order of a snoop message and a completion message to be exchanged between a first integrated circuit die and a second integrated circuit die based at least on status of two bits,
  wherein the first integrated circuit die and the second integrated circuit die are to be coupled through a first interface and a second interface, wherein the snoop message and the completion message are to be exchanged over at least one of the first interface and the second interface, wherein the logic is to allow the completion message to pass the snoop message, wherein the logic is to disallow the snoop message to pass the completion message to a same address, wherein a coherent flit is to be packed based on: one or more epoch bits and one or more packing rules, wherein packing of the coherent flit is to ensure absence of a conflicting message in the coherent flit.

17. The system of claim 16, wherein the first interface is to comprise an On-Die Fabric (OSF) interface that is to utilize a coherent Cross-Die Interface (CDI).

18. The system of claim 17, wherein the coherent CDI is to provide a coherence protocol for communication between an attached device and the OSF interface.

19. The system of claim 16, wherein the second interface is to comprise a non-coherent link layer.

20. The system of claim 16, wherein the two bits are to comprise a snoop epoch bit and a completion epoch bit.

21. The system of claim 16, wherein the snoop message is to comprise an address and the completion message is to exclude an address.

22. The system of claim 16, wherein the logic, the processor having one or more processor cores, and memory are on a same integrated device.

23. The system of claim 16, wherein at least one of the first interface and the second interface is to comprise a point-to-point link.

24. A non-transitory computer-readable medium comprising one or more instructions that when executed on a processor configure the processor to perform one or more operations to:
  determine an order of a snoop message and a completion message to be exchanged between a first integrated circuit die and a second integrated circuit die based at least on status of two bits,
  wherein the first integrated circuit die and the second integrated circuit die are coupled through a first interface and a second interface, wherein the snoop message and the completion message are to be exchanged over at least one of the first interface and the second interface, wherein the completion message is allowed to pass the snoop message, wherein the snoop message is disallowed to pass the completion message to a same address, wherein a coherent flit is to be packed based on: one or more epoch bits and one or more packing rules, wherein packing of the coherent flit is to ensure absence of a conflicting message in the coherent flit.

25. The non-transitory computer-readable medium of claim 24, wherein the first interface comprises an On-Die Fabric (OSF) interface that utilizes a coherent Cross-Die Interface (CDI).

26. The non-transitory computer-readable medium of claim 25, further comprising one or more instructions that when executed on the processor configure the processor to perform one or more operations to cause the coherent CDI to provide a coherence protocol for communication between an attached device and the OSF interface.

* * * * *